Figure 1:
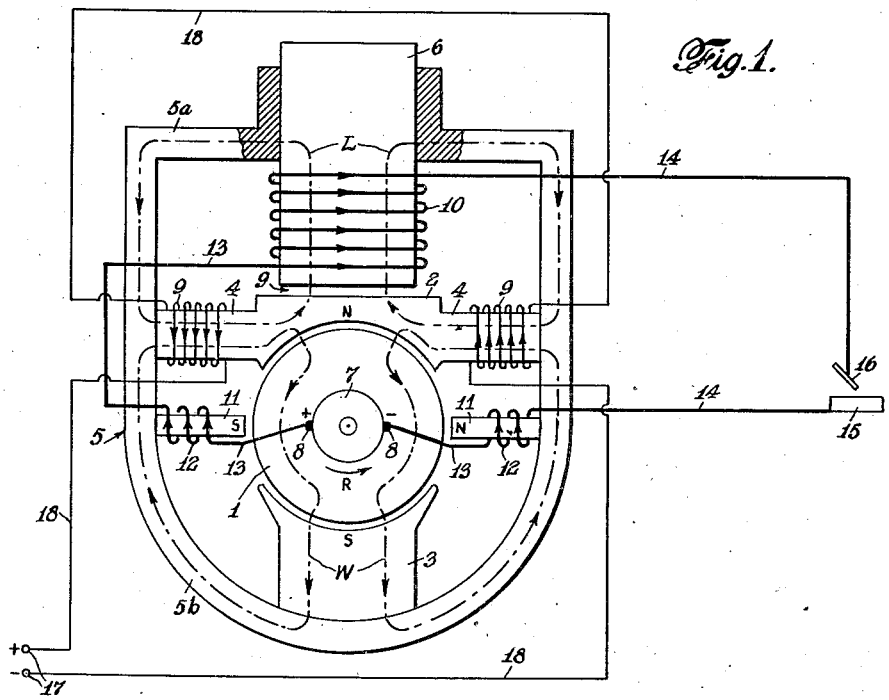

July 28, 1942.     J. TYRNER     2,291,008
DIRECT-CURRENT ARC-WELDING GENERATOR
Filed Dec. 6, 1939     4 Sheets-Sheet 1

INVENTOR.
Joseph Tyrner
BY
Williams, Rich & Morse
ATTORNEYS

July 28, 1942.  J. TYRNER  2,291,008
DIRECT-CURRENT ARC-WELDING GENERATOR
Filed Dec. 6, 1939   4 Sheets-Sheet 2
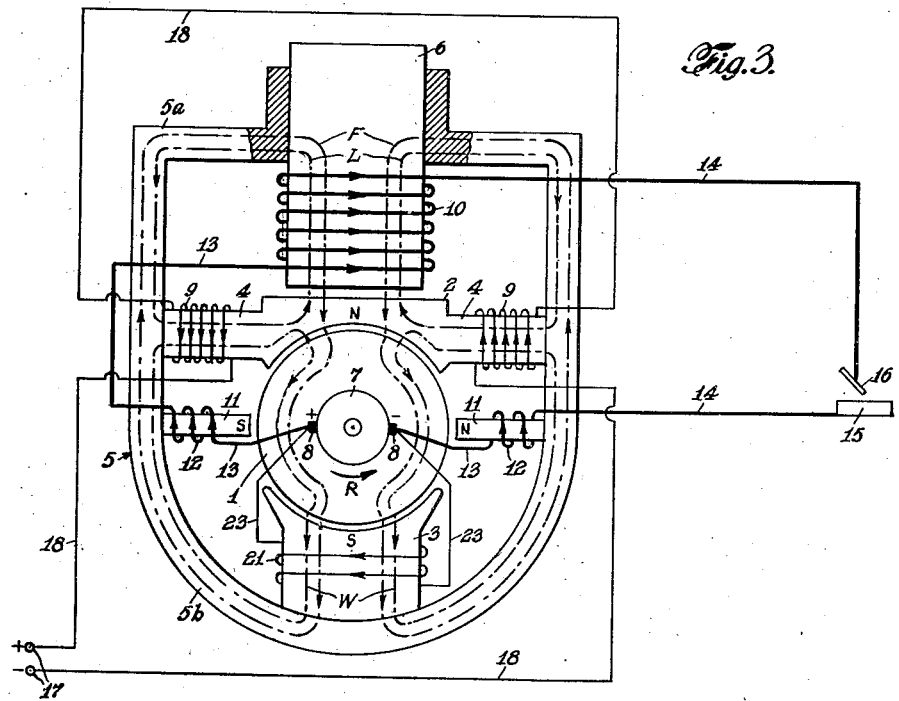
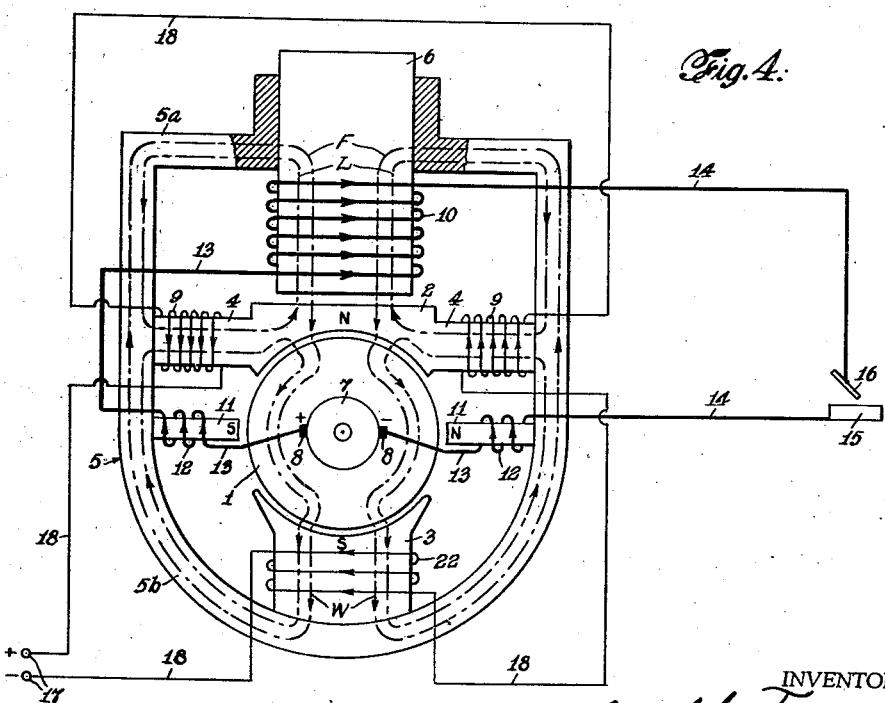
INVENTOR.
Joseph Tyrner
BY
Williams, Rich & Morse
ATTORNEYS July 28, 1942.  J. TYRNER  2,291,008
DIRECT-CURRENT ARC-WELDING GENERATOR
Filed Dec. 6, 1939     4 Sheets-Sheet 3

INVENTOR.
Joseph Tyrner
BY Williams, Rich & Morse
ATTORNEYS

July 28, 1942.  J. TYRNER  2,291,008
DIRECT-CURRENT ARC-WELDING GENERATOR
Filed Dec. 6, 1939  4 Sheets-Sheet 4

INVENTOR.
Joseph Tyrner
BY Williams, Rich & Morris
ATTORNEYS

Patented July 28, 1942

2,291,008

UNITED STATES PATENT OFFICE 2,291,008

DIRECT-CURRENT ARC-WELDING GENERATOR

Joseph Tyrner, Englewood, N. J., assignor to Air Reduction Company, Incorporated, New York, N. Y., a corporation of New York Application December 6, 1939, Serial No. 307,760

5 Claims. (Cl. 171—227)

The present invention relates to direct-current arc welding and has particular reference to generators for use in this art of the type employing a series-field winding for self-regulation.

An object of the invention is to provide a generator of the character mentioned having improved transient characteristics.

In accordance with the invention, self-regulation is effected by the use of a series-field winding of cumulative action with respect to the main field winding. A field magnet frame is employed which provides a magnetic path for leakage flux outside the armature in addition to the usual magnetic path for working flux through the armature, such frame being constructed to include a saturated portion common to each of the two paths. The main field winding interlinks with each of the two paths, while the series-field winding interlinks only with the leakage flux path. With the series-field winding supporting the main field winding in the leakage flux path, self-regulation is obtained with improved transient characteristics.

The foregoing generator construction permits the inclusion of various other features of construction with additional advantages. By controlling the reluctance of the leakage flux path, a convenient means is provided for varying the operating current output. By taking the excitation for the main field winding from an auxiliary brush and the load brush following it in the direction of armature rotation, the means effecting the operating current output variation is made to provide both higher and lower operating current output values. By the use of an auxiliary field winding of either cumulative action in the working flux path or differential action in the leakage flux path and of a type adapted to be supplied with open-circuit excitation, the operating current output may be varied by the aforementioned reluctance control without varying the open-circuit voltage, aside from which more economical production of the open-circuit voltage is obtained regardless of the means effecting the operating current output variation. By the use of an auxiliary series-field winding of cumulative action in the working flux path, the limits of the operating current output variation may be controlled with reference to the degree of internal reactance desired. These and other specific advantages of the invention will hereinafter become apparent in the detailed description of the drawings.

Figure 5:
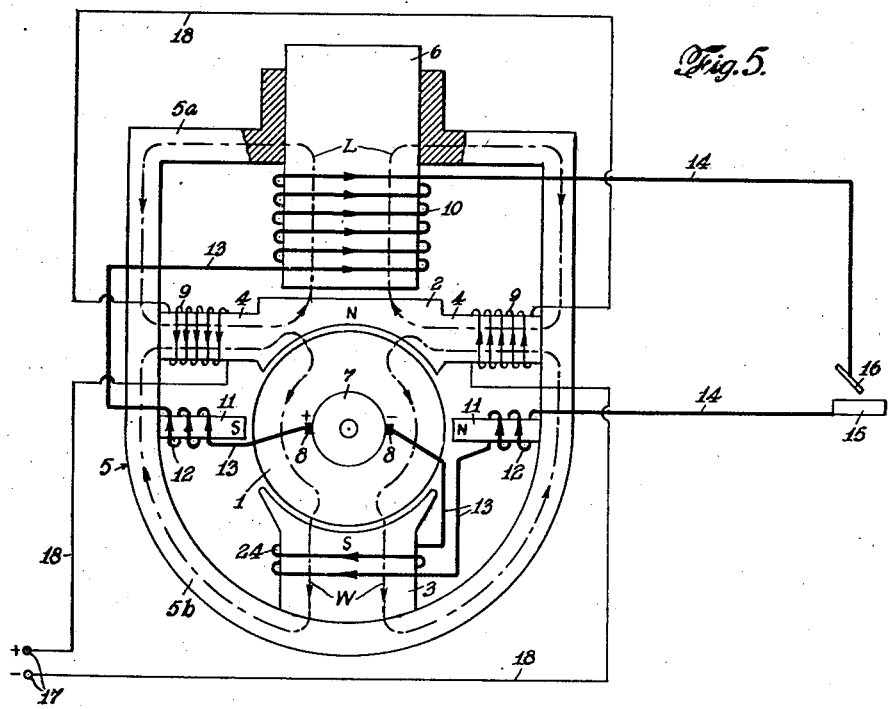
Figure 6:
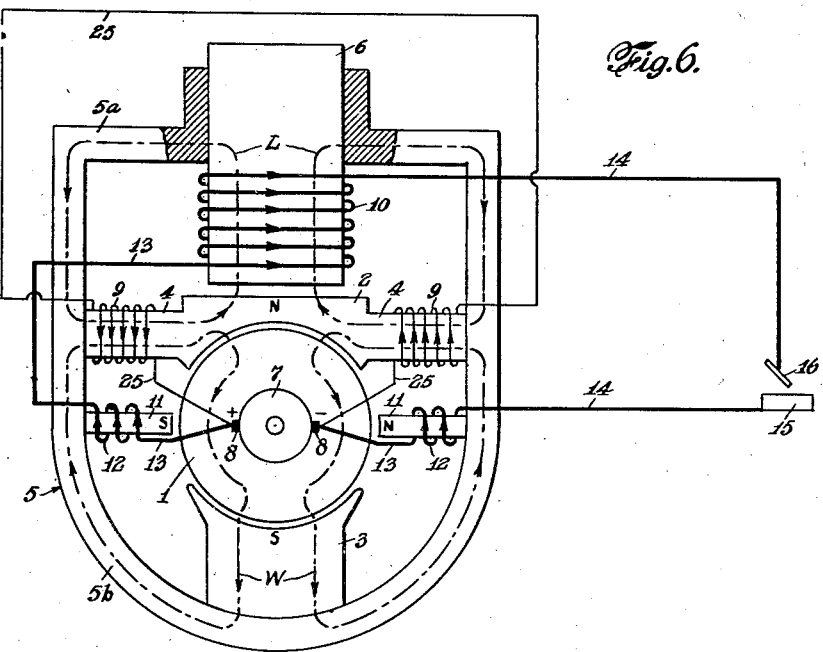
Figure 7:
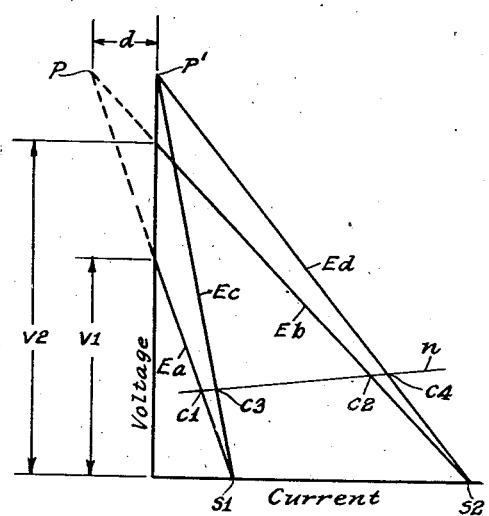
Figure 8:
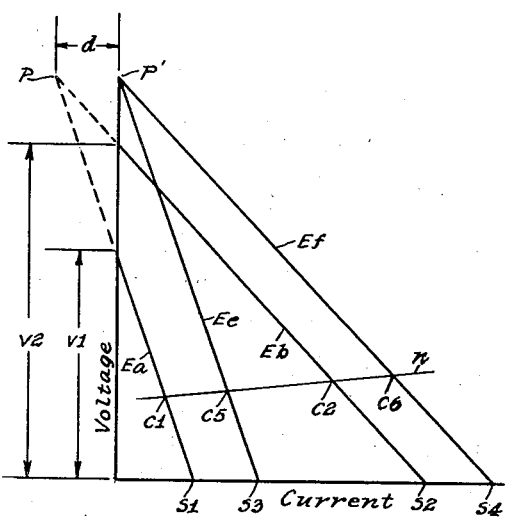
Figure 9:
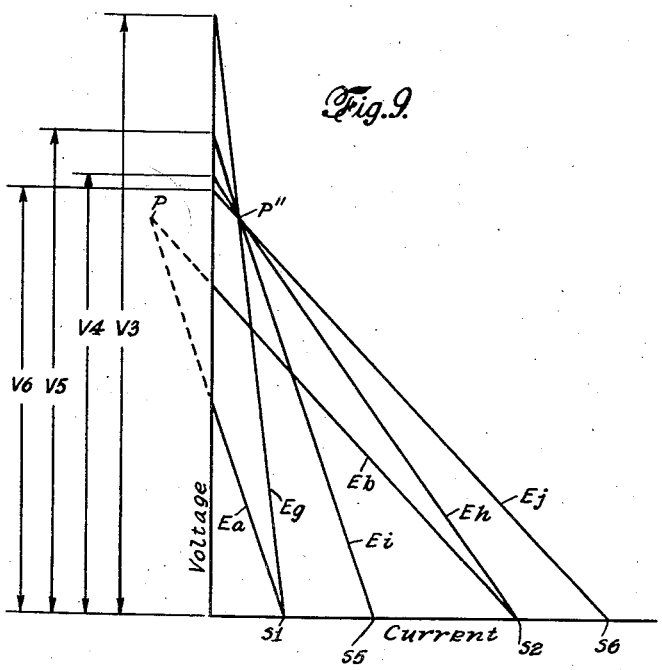

Figs. 1 to 6 are schematic views of two-pole machines embodying the invention, while Figs. 7 to 9 are explanatory diagrams appertaining to external characteristics obtainable by the invention.

Each of the six machines illustrated comprises a two-pole armature 1 of conventional type adapted to rotate between diametrically opposite poles 2 and 3. The upper pole 2 is of the Manchester type supported by side supporting cores 4 from the outer yoke 5 of the magnet frame, which includes an upper yoke extension 5a magnetically cooperating with the upper pole 2 through a regulating core 6 adapted by its inward and outward movement to vary the air gap g formed between its lower surface and the upper surface of the upper pole 2. The cores 4 of each machine are of restricted cross-section resulting in their being magnetically fully saturated under all operating conditions. As shown, the lower pole 3 may be of the usual type extending radially inwards from the lower yoke portion 5b magnetically cooperating with each of the two poles 2 and 3. In each machine, the armature 1 is equipped with a commutator 7 provided with two load brushes 8, the arrow R indicating an assumed counter-clockwise rotation of the armature 1 as being required to cause the brushes 8 to have their respective polarities indicated.

The field winding arrangement of each machine includes main field coils 9 carried by the cores 4, and a series-field coil 10 suitably supported in surrounding relation to the regulating core 6. The coils 9 produce working flux W through the armature, as well as leakage flux L through the controlled reluctance path provided by the regulating core 6. The series-field coil 10 contributes to the production of the leakage flux L, in which respect it is wound to assist the coils 9. In each machine, the assumed directions of the two fluxes are such that north and south polarities are respectively produced in the two poles 2 and 3 by the working flux W, as is indicated by the usual symbols N and S.

As shown, each machine may include the usual interpole cores 11 disposed to align with the armature commutating zones, and the usual series coils 12 carried by the interpole cores 11, it being understood that the coils 12 should in the usual manner be wound to produce north and south polarities in the interpole cores 11 respectively preceding the main poles of north and south polarities in the direction of armature rotation R.

The load brushes 8 of each machine are shown connected by conductors 13 in series circuit relation to the series-field coil 10 and interpole coils 12, and thence by conductors 14 in series circuit relation to a work piece 15 and a welding electrode 16 thereon.

Referring to Fig. 1, the machine illustrated in this figure has its main field coils 9 constantly excited from an independent source of current 17, across which such coils are shown connected in series with one another by conductors 18, it being understood that a parallel connection of such coils may be used in practice without change in their performance.

Still referring to Fig. 1, no current flows on open-circuit through the series-field coil 10, which is therefore ineffective in producing the leakage flux L. On the other hand, the coils 9 on open-circuit are effective in producing both the working flux W and the leakage flux L in relative amounts depending on the position of the regulating core 6. Under load conditions, the series-field coil 10 becomes excited by the load current and contributes more and more to the production of the leakage flux L with increase of such current, the leakage flux L finally attaining a maximum value on short-circuit. Because of saturation in the cores 4, substantially no change in the sum of the two fluxes W and L is produced by this increase in the leakage flux L; but increase of the flux produced through the leakage path by the series coil 10 decreases by the same amount the working flux through the armature produced by the main field coils 9. Consequently, the coils 9, although producing no more of the leakage flux L under any load than on open-circuit, are caused under increasing load to produce less and less of the working flux W. Since this is the only one of the two fluxes W and L to generate voltage in the armature, it is apparent that the machine of Fig. 1 is characterized by a self-regulating drop in terminal voltage from open-circuit to short-circuit conditions, the working flux W finally attaining a short-circuit value merely in excess of zero to enable it to generate the slight terminal voltage required for short-circuit current flow.

The principle of self-regulation described in connection with the machine of Fig. 1 results in greatly improved transient characteristics, as will now be explained.

Since the generator construction of the invention employs a series-field winding of cumulative action with respect to the main field winding, the usual current surges accompanying the sudden resistance changes in welding operations are actually minimized by transformer action of the series-field winding on the main field winding. In the machine of Fig. 1, any sudden increase in the leakage flux L due to resistance decrease in the load circuit (increasing the excitation of the series-field winding 10) induces current in the main field coils 9 of such direction as to decrease the working flux W; while any sudden decrease in the leakage flux L due to resistance increase in the load circuit (decreasing the excitation of the series-field coil 10) induces current in the main field coils 9 of such direction as to increase the working flux W. Regardless of the nature of the resistance change in the load circuit, the machine of Fig. 1 thus operates to limit the magnitude of any abnormal change in the load current (developing from such resistance change) by the accompanying change in the generated voltage. It is clear that the generator construction of the invention is one according to which transformer action of the series-field winding on the main field winding is not at all objectionable, but on the contrary decidedly beneficial.

Another factor contributing to improved transient characteristics in the generator construction of the invention is the saturated portion included in its field magnet frame. In the machine of Fig. 1, the sum of the two fluxes W and L must at all times remain substantially constant because of saturation in the cores 4. This in itself is effective in varying the working flux W inversely to the leakage flux L in response to resistance change in the load circuit, and is therefore effective in limiting the amplitude of any abnormal change in the load current (developing from such resistance change) by the accompanying change in the generated voltage. It is clear that the saturated magnet frame portion included in the generator construction of the invention largely contributes to its improved transient characteristics.

Besides minimizing the usual current surges in welding operations, the generator construction of the invention results in rapid recovery incident to such surges. This is essentially due to the fact that either magnetic path provided by its field magnet frame may as the occasion arises draw flux from the other. In the machine of Fig. 1, working flux W is always available to become leakage flux L in response to a resistance decrease in the load circuit (increasing the excitation of the series-field winding 10); while leakage flux L is always available to become working flux W in response to a resistance increase in the load circuit (decreasing the excitation of the series-field winding 10). Regardless of the nature of the resistance change in the load circuit, the machine of Fig. 1 thus readily responds to such resistance change, with the result that any abnormal change in the load current (developing from such resistance change) is quickly terminated. It is clear that the generator construction of the invention has transient characteristics which as a whole are excellent.

Again referring to Fig. 1, the regulating core 6 by its control of the gap $g$ functions to vary the operating current output. This is evident from the fact that the short-circuit value of the load current required to take substantially all of the working flux W out of the armature depends on the reluctance of the magnetic path for the leakage flux L. An outward movement of the regulating core 6 increases the operating current output by increasing the gap $g$, while an inward movement of the regulating core 6 decreases the operating current output by decreasing the gap $g$, minimum operating current output being obtained with the regulating core 6 in its innermost position of contact with the upper pole 2. While this reluctance control by the regulating core 6 affords a convenient means for varying the operating current output, it is understood that this variation may be effected in any other manner, as by a control of the turns of the series-field coil 10.

Figure 2:
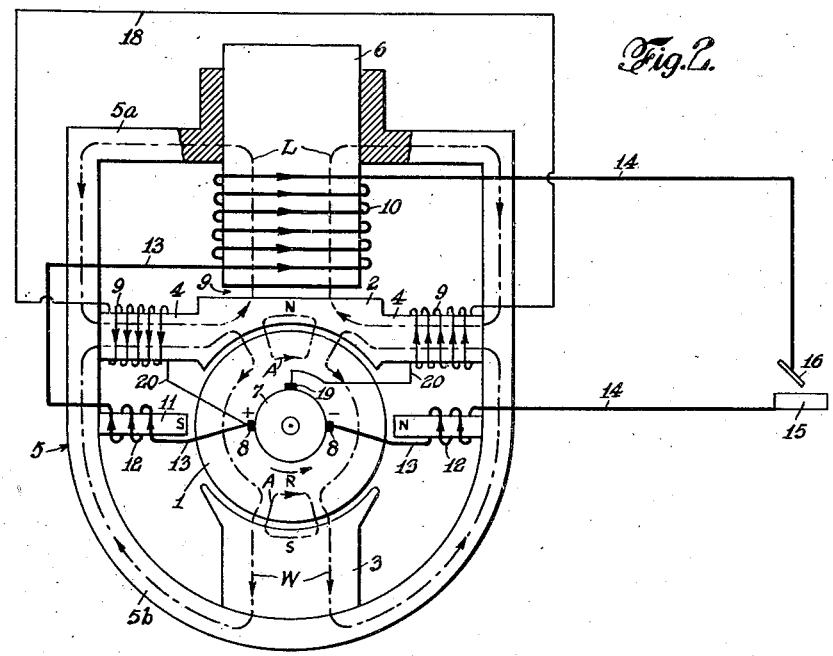

Referring to Fig. 2, the main field coils 9 in the machine of this figure are excited from the armature 1 by making use of its cross-magnetization by the load current, for which purpose an auxiliary brush 19 is carried by the commutator 7 for use between the load brushes 8. As shown, the armature 1 under load establishes cross-flux A through each of its upper and lower halves. The auxiliary brush 19 may be positioned to cooperate with either of these armature halves, but must be used with the load brush 8 following it in the direction of armature rotation R, under which condition the cross-flux A assists the working flux W through the armature coils connected by the armature rotation to the load brush 8 employed. The auxiliary brush 19 is shown to be positioned to cooperate with the upper armature half, in which position the load brush 8 following it in the direction of armature rotation R is of positive polarity. Conductors 20 therefore connect the main field coils 9 across the auxiliary brush 19 and the load brush 8 of positive polarity, it being understood that a parallel connection of such coils across the same brushes may in practice replace their series connection illustrated. Although the auxiliary brush 19 is shown positioned in electrical quadrature with the load brushes 8, it is evident that its usefulness is not limited to this particular position, from which it may depart considerably in practice. As positioned to cooperate with the upper armature half, the auxiliary brush 19 is obviously of negative polarity with respect to its associated brush 8 of positive polarity.

Still referring to Fig. 2, the exciting voltage between the cooperating brushes 19 and 8 is generated on open-circuit by the working flux W alone and under load by the working flux W in conjunction with the cross-flux A. Under increasing load, the working flux W decreases more and more to finally become practically zero on short-circuit, but this is compensated by the corresponding increase in the cross-flux A, which finally becomes a maximum on short-circuit. From this it is apparent that the main field coils 9 are supplied with proper excitation under all operating conditions.

In accordance with the invention, the exciting of the main field winding included in its generator construction in the manner described in connection with the machine of Fig. 2 has the advantage of much wider operating current output variation by the means employed for this purpose. In this connection it should be noted that the generator construction of the invention is one according to which substantially the only flux produced in the armature on short-circuit is the cross-flux established by the armature itself. In the machine of Fig. 2, the short-circuit excitation of the main field coils 9 therefore varies substantially in direct proportion to the short-circuit value of the load current as the operating current output is increased or decreased by the regulating core 6, which has the effect to considerably increase the effectiveness of such core toward either of its limits of adjustment, the short-circuit excitation of the main field coils 9 being considerably greater than their open-circuit excitation for the highest operating current output setting and considerably less than their open-circuit excitation for the lowest operating current output setting. It is clear that the generator construction of the invention permits varying the operating current output over a range of much higher and lower values by its inclusion of the exciting means described in connection with the machine of Fig. 2.

Referring to Figs. 3 and 4, the lower pole 3 carries an auxiliary field coil 21 in the machine of Fig. 3 and an auxiliary field coil 22 in the machine of Fig. 4, each of these two machines being otherwise identical to the machine of Fig. 1. Each of the coils 21 and 22 is wound to assist the main field coils 9 in the production of the working flux W and is of a type adapted to contribute to such working flux production on short-circuit. The coil 21 (Fig. 3) is a shunt-field coil shown connected as a short shunt by conductors 23 across the load brushes 8, while the coil 22 (Fig. 4) is a constantly excited coil shown connected in the series circuit of the conductors 18 across the source 17, it being understood that any circuit connection of the coil 21 (Fig. 3) adapting it to receive current from the load brushes 8 and any circuit connection of the coil 22 (Fig. 4) adapting it to receive current from the source 17 may be used in practice. As noted, each of the coils 21 and 22 contributes to the production of the working flux W without contributing to the leakage flux L, which is the primary function of these coils in the machines of Figs. 3 and 4.

In accordance with the invention, when the operating current output in its generator construction is varied by reluctance control of the leakage path outside the armature, as in the machines of Figs. 3 and 4, the use of an auxiliary field winding in the manner described in connection with these machines is of particular advantage because of its compensating effect in connection with the undesirable variation in open-circuit voltage normally inherent in such operating current output variation, as will now be more particularly described by comparison of the machines of Figs. 3 and 4 with the machine of Fig. 1.

In the machine of Fig. 1, the open-circuit voltage necessarily decreases as the regulating core 6 is moved inwardly to decrease the operating current output, by which regulating core movement the main field coils 9 are rendered more effective in producing the leakage flux L and therefore less effective in producing the working flux W. In the machines of Figs. 3 and 4, this condition can be fully corrected by proper design of their auxiliary field coils 21 and 22. Since these coils interlink with the path of the working flux W without interlinking with the path of the leakage flux L, they function through the upper yoke portion 5a to oppose the production of the leakage flux L by the main field coils 9, as illustrated by the imaginary flux F. Moreover, they increasingly oppose the production of the leakage flux L in this manner with decreasing distance of the regulating core 6 from the upper pole 2. Therefore, they may be designed to cause the leakage flux L on open-circuit to become zero for any position of the regulating core 6. For this zero open-circuit value of the leakage flux L, the condition prevailing in the machine of Fig. 1 is fully corrected in the machines of Figs. 3 and 4, the working flux W produced by the main field coils 9 in conjunction with either one of the auxiliary field coils 21 and 22 and hence the voltage generated by such flux being caused to have constant values throughout the range of operating current output variation provided by the regulating core 6.

Referring to Figs. 7 and 8, the lines $Ea$ and $Eb$ in each of these figures can be regarded as schematically representing the limiting characteristics of terminal voltage against current output obtained by moving the regulating core 6 into its innermost and outermost positions in the machine of Fig. 1. These characteristics are seen to have unequal open-circuit voltage values $V1$ and $V2$, which causes them to meet theoretically at a point P on the left of the voltage axis. It can be proved that the distance $d$ of such point from such axis depends on the reluctance opposing the production of the working flux W outside the cores 4 (substantially the reluctance through the armature between the poles 2 and 3). In the machines of Figs. 3 and 4, the coils 21 and 22 thus function to shift the point P toward the voltage axis by their diminishing action on the open-circuit drop of magnetic potential outside the cores 4, which is equivalent to a reduction in reluctance. In this manner, the point P can be shifted the whole distance $d$ to the point P' on the voltage axis, which merely requires that the open-circuit ampere-turns of the coils 21 and 22 be made strong enough to make such open-circuit drop of magnetic potential zero for any position of the regulating core 6. Assuming this condition to prevail in the machines of Figs. 3 and 4, the lines $Ec$ and $Ed$ schematically represent the corresponding limiting characteristics of the machine of Fig. 3, while the lines $Ee$ and $Ef$ schematically represent the corresponding limiting characteristics of the machine of Fig. 4. As noted, each of these machines raises each of the unequal open-circuit voltage values V1 and V2 to the constant value P'.

Still referring to Figs. 7 and 8, the characteristics $Ec$ and $Ed$ peculiar to the use of the shunt-field coil 21 have the same short-circuit current values S1 and S2 as the characteristics $Ea$ and $Eb$, while the characteristics $Ee$ and $Ef$ peculiar to the use of the constantly excited coil 22 have short-circuit current values S3 and S4 greater than the values S1 and S2 by the current value of the distance $d$. Therefore, the characteristics $Ee$ and $Ed$ slope more steeply than the characteristics $Ee$ and $Ef$, which are parallel to the characteristics $Ea$ and $Eb$. The line $n$ in these figures indicates by its intersection with the various characteristics illustrated the corresponding operating current output values obtained. The operating current output values of the characteristics $Ea$ and $Eb$ are C1 and C2, the operating current output values of the characteristics $Ec$ and $Ed$ are C3 and C4, and the operating current output values of the characteristics $Ee$ and $Ef$ are C5 and C6. As noted, each of the coils 21 and 22 functions to shift the range of operating current output variation normally obtained without its use to include higher operating current output values at the expense of the lower operating current output values, but the extent of this effect by the use of the shunt-field coil 21 is slight as compared to its extent by the use of the constantly excited coil 22. This together with the fact that the shunt-field coil 21 provides for steeper characteristics makes the use of this coil more desirable than the constantly excited coil 22 in correcting for the condition represented by the characteristics $Ea$ and $Eb$.

The use of the coils 21 and 22 should not be regarded as being restricted to the production of the constant open-circuit voltage value P'. If desired, their open-circuit ampere-turns may be made strong enough to shift the point P even beyond the voltage axis, which provides for higher open-circuit voltage throughout the range of operating current output variation. This condition is illustrated in Fig. 9, it being for convenience assumed in this figure that the point P is shifted to the same point P'' on the right of the voltage axis by each of the coils 21 and 22. The use of the shunt-field coil 21 results in limiting characteristics $Eg$ and $Eh$ having open-circuit voltage values V3 and V4, while the use of the constantly excited coil 22 results in limiting characteristics $Ei$ and $Ej$ having open-circuit voltage values V5 and V6. The four voltage values V3 to V6 all differ from one another, but are all higher than the constant value P' obtained in Figs. 7 and 8.

It should be noted that, when the condition illustrated in Fig. 9 is caused to prevail in the machines of Figs. 3 and 4, the flux F is then actually produced on open-circuit, as well as under load until the point P'' is reached. For any position of the regulating core 6, this flux has a maximum open-circuit value from which it decreases to zero at the instant of current passage through the point P''. It is of the same direction as the working flux W, which it therefore assists in generating the terminal voltage from open-circuit to the point P'' for any position of the regulating core 6. Its open-circuit value increases with a resulting increase in open-circuit voltage as the regulating core 6 is moved inwardly to decrease the operating current output, which accounts for the open-circuit voltage values V3 and V5 being higher than the open-circuit voltage values V4 and V6.

As before, the characteristics $Eg$ and $Eh$ peculiar to the use of the shunt-field coil 21 have the same short-circuit current values S1 and S2 as the characteristics $Ea$ and $Eb$. On the other hand, the characteristics $Ei$ and $Ej$ peculiar to the use of the constantly excited coil 22 have still higher short-circuit current values S5 and S6 by reason of their increased distance of parallel separation from the characteristics $Ea$ and $Eb$. Therefore, the aforementioned desirability of employing the shunt-field coil 21 in preference to the constantly excited coil 22 is even greater in connection with the condition illustrated in Fig. 9. As noted, the shunt-field coil 21 provides for a higher range of open-circuit voltage values than the constantly excited coil 22, but this is merely due to the fact that each of these coils is made to shift the point P the same distance to the point P'', which necessitates more open-circuit ampere-turns in the case of the shunt-field coil 21 than in the case of the constantly excited coil 22.

In accordance with the invention, the use in its generator construction of an auxiliary field winding of the type of either one of the coils 21 and 22 also results in more economical production of the open-circuit voltage, as is evident from the fact that the leakage flux L in the machines of Figs. 3 and 4 can be made zero on open-circuit, it being understood that this advantage is entirely independent of the operating current output varying means employed.

In connection with the machines of Figs. 3 and 4, it should be noted that the various effects provided by their respective coils 21 and 22 may also be obtained by the use of similar coils of differential action arranged to interlink with the path of the leakage flux L without interlinking with the path of the working flux W, as by suitably supporting them with the series-field coil 10 in surrounding relation to the regulating core 6. While this possibility should be regarded as being included within the scope of the invention, the use of the cumulative coils 21 and 22 on the lower pole 3 has not only the advantage of greater convenience, but also the advantage of no inductive action with the series-field coil 10.

It is understood that the main field coils 9 in the machines of Figs. 3 and 4 may be excited in the manner described in connection with the machine of Fig. 2. If desired, the coil 22 in the machine of Fig. 4 may also be excited in this manner, the use of this excitation in connection with this particular coil considerably diminishing its increasing action on the lower operating current output limit.

Referring to Fig. 5, the machine of this figure is provided on the lower pole 3 with an auxiliary series-field coil 24 wound to assist the main field coils 9 in the production of the working flux W, the conductors 13 being shown to connect the coil 24 in the series circuit carrying the load current. This machine is otherwise identical to the machine of Fig. 1, the main field coils 9 again deriving their excitation from the independent source 17. As noted, the series-field coil 24 contributes to the production of the working flux W without contributing to the production of the leakage flux L, which condition is indispensable for its proper performance.

In accordance with the invention, the use of its generator construction of an auxiliary series-field winding in the manner described in connection with the machine of Fig. 5 provides the advantage that both operating current output limits may be effectively controlled with reference to the degree of internal reactance desired. As well known in the art, high internal reactance is desirable in welding generators because of its steadying effect on the welding arc. The usual series-field winding employed for self-regulation in such generators provides a convenient means for increasing their internal reactance, but it is often difficult, on the one hand, to increase their internal reactance in this manner to the extent desired without, on the other hand, unduly affecting the range of operating current output variation desired. When the generator construction of the invention is made to include the auxiliary series-field winding described in connection with the machine of Fig. 5, any degree of internal reactance may be obtained in such generator construction without adverse effect on either of its operating current output limits. This feature of the invention will now be more particularly described in connection with the machine of Fig. 5.

For any position of the regulating core 6, it can be shown that the short-circuit current delivered by the machine of Fig. 5 is given by the following general formula:

$$I_s = K \frac{Rg}{N_1 - \alpha N_2} \quad \text{(1)}$$

in which K is a constant depending on the design of the machine, but independent of any other factor in the formula; $Rg$ is the external reluctance to either of the saturated cores 4 opposing the production of the leakage flux L; $N_1$ is the number of turns of the series-field coil 10; $N_2$ is the number of turns of the series-field coil 24; and $\alpha$ is a variable depending on the reluctance $Rg$.

For the innermost position of the regulating core 6, it can be shown that the variable $\alpha$ is practically unity. Therefore, formula 1 becomes the following specific formula for the lower short-circuit current limit:

$$I_{s(min)} = K \frac{Rg}{N_1 - N_2} \quad \text{(2)}$$

This second formula shows that the lower short-circuit current limit is controlled by the difference in the number of turns of the series-field coil 10 and the number of turns of the series-field coil 24. This means that the lower short-circuit current limit does not change by effecting the same increase of number of turns in each of the series-field coils 10 and 24.

For the outermost position of the regulating core 6, it can be shown that the variable $\alpha$ is a maximum greater than unity. Let this maximum be greater than one by the quantity $n$. Formula 1 then becomes the following specific formula for the upper short-circuit current limit:

$$I_{s(max)} = K \frac{Rg}{N_1 - (1+n)N_2} \quad \text{(3)}$$

This third formula shows that the influence of the series-field coil 24 on the upper short-circuit current limit is multiplied. This means that a given increase in the number of turns of the series-field coil 10 requires a smaller increase in the number of turns of the series-field coil 24 to restore the upper short-circuit current limit.

It necessarily follows from the foregoing facts that, by properly increasing the number of turns in each of the series-field coils 10 and 24, the machine of Fig. 5 may have its internal reactance increased to any extent desired without adversely affecting either of its operating current output limits. Each of these limits is decreased by increasing the number of turns of the series-field coil 10, but increased by increasing the number of turns of the series-field coil 24. Actually, the use of the series-field coil 24 in the machine of Fig. 5 results in a widening of the range of operating current output variation provided by the regulating core 6, as a comparison of formulas 2 and 3 shows. But this is a distinct advantage in itself having no adverse effect on the limits of such widened range, which may be shifted at will to include either higher or lower operating current output values by proper choice of the ratio of the number of turns in the series-field coil 24 to the number of turns in the series-field coil 10. It is clear that the series-field coil 24 functions in the machine of Fig. 5 as an effective control of its operating current output limits with reference to the degree of internal reactance desired.

The use of the series-field coil 24 in the machine of Fig. 5 should not be regarded as being restricted to the reluctance control by the regulating core 6. Any other means for varying the operating current output may be employed with the same advantage of effective control of either limit of the operating current output variation by the series-field coil 24. In the absence of the reluctance control by the regulating core 6, however, there is no widening effect produced by the series-field coil 24 on the range of operating current output variation, the limits of which are each dependent on the difference in number of turns between the two coils 10 and 24.

Also to be noted is the fact that the series-field coil 24 in the machine of Fig. 5 has the same transformer action on the main field coils 9 as the series-field coil 10. By reason of this fact alone, the use of the series-field coil 24 in the machine of Fig. 5 results in further tendency toward improved transient characteristics.

The machine of Fig. 5 may include any of the features of the invention described in connection with the machines of Figs. 2 to 4. When either of the auxiliary field coils 21 and 22 of the machines of Figs. 3 and 4 is used in conjunction with the series-field coil 24 of the machine of Fig. 5, there is still further tendency toward improved transient characteristics by reason of transformer action of the series-field coil 24 on one or the other of the auxiliary field coils 21 and 22, as the case may be.

Referring to Fig. 6, the machine illustrated in this figure differs from any of the five others illustrated in that the main field coils 9 are shunt excited from the load brushes 8. As shown, conductors 25 connect these coils in this machine in series circuit relation to one another and in short shunt relation to the load brushes 8, it being understood that any other circuit connection adapting them to be supplied with current from these brushes may be used in practice. The machine of Fig. 6 is otherwise identical to the machine of Fig. 1.

As well known in the art, the use of shunt excitation for the main field winding of welding generators is often difficult. The generator construction of the invention is one the operation of which is not at all affected by the use of such excitation for its main field winding. This will now be more particularly described in connection with the machine of Fig. 6.

For any position of the regulating core 6, the excitation of the main field coils 9 in the machine of Fig. 6 decreases from a maximum on open-circuit to substantially zero on short-circuit. On the other hand, the excitation of the series-field coil 10 increases from zero on open-circuit to a maximum on short-circuit. Therefore, the variation in the excitation of the series-field coil 10 functions through the saturated cores 4 to compensate for the variation in the excitation of the main field coils 9. Moreover, as the regulating core 6 is moved in either direction of adjustment to vary the operating current output, the variation in the reluctance of the air gap $g$ compensates for the short-circuit variation in the excitation of the series-field coil 10. In view of these facts it is apparent that the machine of Fig. 6, in spite of its use of shunt excitation for the main field coils 9, can be designed so that, for any position of the regulating core 6, the total flux produced through the saturated cores 4 has a substantially constant value from open-circuit to short-circuit conditions, which is the condition required for its proper operation.

The use of shunt excitation for the main field coils 9 in the machine of Fig. 6 should not be regarded as being restricted to the reluctance control by the regulating core 6, the tendency of the total flux produced through the cores 4 to remain constant under all operating conditions being independent of the means employed for varying the operating current output, which means functions in any case to maintain the short-circuit value of the leakage flux L substantially constant. In fact, the use of shunt excitation for the main field coils 9 in the machine of Fig. 6 is possible in the absence of any means for varying the operating current output.

The machine of Fig. 6 may include any of the features of the invention described in connection with the machines of Figs. 3 to 5.

It now becomes apparent that there has been provided a direct-current generator construction for arc welding which provides for self-regulation with improved transient characteristics, but which may include various other constructional features with additional advantages, it being understood that the invention is not limited to its foregoing illustrative embodiments, but that it may be carried out in various other ways within the purview of the claims.

What is claimed is:

1. A direct-current generator for arc welding according to claim 5, provided with an auxiliary field coil cooperating with said first mentioned pole-piece and producing working magnetic flux in the same direction as the working flux produced through the armature by said main field coils.

2. A direct-current generator for arc welding according to claim 5, provided with an auxiliary field coil cooperating with said first mentioned pole-piece and producing working magnetic flux in the same direction as the working flux produced through the armature by said main field coils, said auxiliary field coil being connected to the brushes of said generator and said main field coils being constantly excited from an independent current source.

3. A direct-current generator for arc welding according to claim 5, provided with an auxiliary field coil cooperating with said first mentioned pole-piece and producing working magnetic flux in the same direction as the working flux produced through the armature by said main field coils, said auxiliary field coil and said main field coils being both constantly excited from an independent current source.

4. A direct-current generator for arc welding according to claim 5, provided with an auxiliary series field coil cooperating with said first mentioned pole-piece and producing working magnetic flux in the same direction as the working flux produced through the armature by said main field coils.

5. A direct-current generator for arc welding, comprising a two-pole field magnet frame, a pole-piece supported by said frame, another pole-piece located both physically and electrically diametrically opposite said first mentioned pole-piece and connected to said frame by supporting cores of such restricted cross-section that they are magnetically fully saturated under all operating conditions, a regulating core supported by said frame for movement toward and away from said second mentioned pole-piece, a two-pole armature arranged for rotation between said diametrically opposite pole-pieces, main field coils cooperating with and producing through said magnetically fully saturated supporting cores working magnetic flux passing from one pole-piece to the other pole-piece through said armature and leakage flux passing through said regulating core, and a series winding cooperating with said regulating core and producing flux only through said leakage flux path and in the same direction as the leakage flux produced by said main field coils whereby increase of the flux produced through the leakage path by said series winding decreases by the same amount the working flux through the armature produced by said main field coils.

JOSEPH TYRNER.